Patented Dec. 27, 1932

1,891,930

UNITED STATES PATENT OFFICE

HEINRICH HOPFF, OF LUDWIGSHAFEN-ON-THE-RHINE, AND MANFRED DUNKEL, OF MANNHEIM, GERMANY, ASSIGNORS TO I. G. FARBENINDUSTRIE AKTIENGESELL-SCHAFT, OF FRANKFORT-ON-THE-MAIN, GERMANY, A CORPORATION OF GERMANY

PRODUCTION OF ORGANIC COMPOUNDS CONTAINING OXYGEN FROM CARBON MONOXIDE AND HALOGENATED NONAROMATIC HYDROCARBONS

No Drawing. Application filed May 27, 1929, Serial No. 366,519, and in Germany May 29, 1928.

The present invention relates to the production of organic compounds containing oxygen.

In the U. S. Patent No. 1,801,350, one of the present applicants has described processes for the production of organic oxygen compounds, in which processes carbon monoxide is allowed to act at a pressure above 10 atmospheres, on non-aromatic hydrocarbons in the presence of anhydrous aluminium chloride and the like. The resulting products chiefly consist of ketones and carboxylic acids.

We have now found that compounds containing oxygen are also obtained by acting on halogen derivatives of non-aromatic hydrocarbons, with carbon monoxide at a pressure above 10 atmospheres and in the presence of a halide selected from the group consisting of halides of aluminium and of boron or of mixtures of the said halides. Compounds containing a labile hydrogen atom, i. e. alcohols, acids and amines do not come into consideration as initial materials, since they are liable to split off water during the reaction, and also compounds containing more than one halogen atom connected with a carbon atom such as chloroform and carbon tetrachloride do not come into consideration since they are inoperative. A suitable working pressure is from about 80 to 150 atmospheres, though lower and any attainable higher pressures may be employed. The reaction proceeds, though slowly even in the cold, for example at about 10° C., and at rather low pressure such as about 50 atmospheres but it is preferable to work at an elevated temperature and at a pressure above the aforesaid pressure though, when heating, a pressure of about 10 atmospheres is sometimes sufficient for the desired purposes. Pressure and temperature may be varied within wide limits, but the employment of moderate temperature, as for example from 30° to 60° C., is advisable, in order to prevent secondary reactions. Generally, a temperature of about 250° C. should not be exceeded. The reaction products obtained possess a composition similar to that of the products obtainable from hydrocarbons, but the yield of carboxylic acids is greater in the present case. In order to avoid a condensation of the halogenated non-aromatic hydrocarbons a diluent which is not attacked under the conditions of working, namely carbon tetrachloride and chloroform, may be added.

The following examples further illustrate the nature of the invention but the invention is not restricted to these examples. The parts are by weight.

*Example 1*

300 parts of anhydrous aluminium chloride are introduced while cooling, into 500 parts of n-butyl chloride. As soon as the evolution of hydrochloric acid subsides, the mixture is placed in a high pressure retort, provided with stirrers, and carbon monoxide is forced in under a pressure of 120 atmospheres, and the mixture is stirred at 50° C., with occasional admission of more carbon monoxide until no further drop in pressure occurs. The reaction product consists of two layers. The upper layer of unaltered butyl chloride is removed and may be employed in another charge. The lower, dark colored layer consists of an aluminium chloride compound of the reaction product. It is poured onto ice, acidified with hydrochloric acid, and distilled with steam. The oil which passes over is agitated with dilute caustic soda solution and the resulting alkaline solution is acidified with sulphuric acid and extracted with ether. On expelling the ether, an oil with a rancid smell is obtained consisting chiefly of a carboxylic acid, $C_5H_{10}O_2$, and higher homologues of such acid and ketones can also be detected.

*Example 2*

100 parts of ethyl chloride and 150 parts of anhydrous aluminium chloride are heated at from 45° to 50° C. for 5 hours in the presence of carbon monoxide, at 50 atmospheres pressure, as described in Example 1. The reaction product is treated in the manner described in Example 1 and furnishes about 50 parts of propionic acid, the remainder being chiefly ketones.

The ethyl chloride may be replaced by other halogenated aliphatic or hydroaromatic hydrocarbons, such as isobutyl chloride, cyclohexyl chloride and the like. The anhydrous aluminium chloride may be replaced by other substances, which facilitate the introduction of the carbon monoxide, such as anhydrous aluminium bromide, boron fluoride and the like.

*Example 3*

100 parts of the double compound of dimethyl ether with boron fluoride, which boils at about 121° C. at atmospheric pressure, are heated at 180° C. for 4 hours with carbon monoxide at a pressure of 150 atmospheres, in an autoclave provided with stirrers. The reaction mixture yields, after decomposition with water, 60 per cent of the amount of acetic acid theoretically obtainable according to the equations:

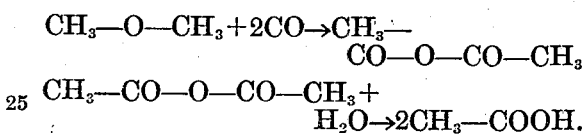

$$CH_3-CO-O-CO-CH_3 + H_2O \rightarrow 2CH_3-COOH.$$

If 100 parts of the compound of diethyl ether and boron fluoride be employed in the place of the compound of dimethyl ether and boron fluoride, the absorption of the carbon monoxide takes place at 120° C. In addition to 60 per cent of the calculated yield of propionic acid, small amounts of fatty acids of higher boiling point can be isolated from the reaction mixture.

*Example 4*

10 parts of ethylene chloride are fed into an autoclave together with 13 parts of aluminium chloride, whereupon carbon monoxide is introduced until a pressure of from 60 to 70 atmospheres is attained. By slowly heating to from 60° to 70° C. the reaction proceeds very rapidly and yields a mixture of chlorine containing oxygen compounds, i. e. of acid chlorides, chlorinated ketones, chlorinated aldehydes etc. In order to avoid a condensation of the ethylene chloride with itself, a diluent such as carbon tetrachloride may be added.

What we claim is:—

1. The process for the production of organic oxygen compounds which comprises acting with carbon monoxide and a halide selected from the group consisting of the halides of aluminium and of boron, on a halogenated non-aromatic hydrocarbon which may contain not more than one halogen atom connected with a carbon atom at a pressure above 10 atmospheres.

2. The process for the production of organic oxygen compounds which comprises acting with carbon monoxide and a halide selected from the group consisting of the halides of aluminium and of boron, on a halogenated non-aromatic hydrocarbon which may contain not more than one halogen atom connected with a carbon atom at a pressure above 10 atmospheres while heating.

3. The process for the production of organic oxygen compounds which comprises acting with carbon monoxide and a halide selected from the group consisting of the halides of aluminium and of boron, on a halogenated aliphatic open chain hydrocarbon containing not more than one halogen atom connected with a carbon atom at a pressure above 10 atmospheres.

4. The process for the production of organic oxygen compounds which comprises acting with carbon monoxide and a halide selected from the group consisting of the halides of aluminium and of boron, on a halogenated aliphatic open chain hydrocarbon containing not more than one halogen atom connected with a carbon atom at a pressure above 10 atmospheres while heating.

5. The process for the production of organic oxygen compounds which comprises acting with carbon monoxide and a halide selected from the group consisting of the halides of aluminium and of boron, on a halogenated non-aromatic hydrocarbon which may contain not more than one halogen atom connected with a carbon atom at a pressure above 10 atmospheres and in the presence of an inert diluent.

6. The process for producing organic oxygen compounds which comprises acting with carbon monoxide and a halide selected from the group consisting of the halides of aluminium and boron on a halogenated non-aromatic hydrocarbon, containing not more than one halogen atom connected with a carbon atom at a pressure above 10 atmospheres, and a temperature of 30 to 250° C. in the presence of an inert diluent.

7. The process for producing organic oxygen compounds which comprises acting with carbon monoxide and a halide selected from the group consisting of the halides of aluminium and boron upon n-butyl chloride at a pressure above 10 atmospheres.

8. The process for producing organic oxygen compounds which comprises acting with carbon monoxide and a halide selected from the group consisting of the halides of aluminium and boron upon n-butyl chloride at a pressure above 10 atmospheres in the presence of an inert diluent while heating.

9. The process for producing organic oxygen compounds which comprises acting with carbon monoxide and a halide selected from the group consisting of the halides of aluminium and boron on ethyl chloride at a pressure above 10 atmospheres.

10. The process for producing organic oxygen compounds which comprises acting with carbon monoxide and a halide selected from the group consisting of the halides of aluminium and boron on ethyl chloride at a pressure above 10 atmospheres in the presence of an inert diluent while heating.

In testimony whereof we have hereunto set our hands.

HEINRICH HOPFF.
MANFRED DUNKEL.